US009854649B2

United States Patent
(12) United States Patent
Lochmann et al.

(10) Patent No.: US 9,854,649 B2
(45) Date of Patent: Dec. 26, 2017

(54) OPERATING DEVICE FOR LAMPS FOR TRANSMITTING INFORMATION

(71) Applicant: TRIDONIC GMBH & CO KG, Dornbirn (AT)

(72) Inventors: Frank Lochmann, Esseratweiler (DE); Patrick Marte, Götzis (AT); Johannes Bachmann, Götzis (AT)

(73) Assignee: Tridonic GmbH & Co KG (AT)

( * ) Notice: Subject to any disclaimer, the term of this patent is extended or adjusted under 35 U.S.C. 154(b) by 0 days.

(21) Appl. No.: 15/129,009

(22) PCT Filed: Mar. 11, 2015

(86) PCT No.: PCT/EP2015/055008
§ 371 (c)(1),
(2) Date: Sep. 26, 2016

(87) PCT Pub. No.: WO2015/144430
PCT Pub. Date: Oct. 1, 2015

(65) Prior Publication Data

US 2017/0111977 A1 Apr. 20, 2017

(30) Foreign Application Priority Data

Mar. 27, 2014 (DE) ........................ 10 2014 205 746

(51) Int. Cl.
*H05B 37/02* (2006.01)
*H05B 33/08* (2006.01)
*H04B 3/54* (2006.01)

(52) U.S. Cl.
CPC ......... *H05B 37/0263* (2013.01); *H04B 3/542* (2013.01); *H05B 33/0815* (2013.01)

(58) Field of Classification Search
CPC ............ H05B 33/0815; H05B 33/0818; H05B 33/0884; H05B 33/0809; H05B 33/0848;
(Continued)

(56) References Cited

U.S. PATENT DOCUMENTS 8,810,141 B2 * 8/2014 Takeda ............... H05B 33/0818 315/192
2011/0222595 A1 * 9/2011 Choi ...................... H04B 3/548 375/238

(Continued)

FOREIGN PATENT DOCUMENTS

WO 9948340 9/1999
WO 2010117340 10/2010

OTHER PUBLICATIONS

Austria Search Report dated Mar. 16, 2016, in Austria Application GM 140/2014.

(Continued)

*Primary Examiner* — Douglas W Owens
*Assistant Examiner* — Syed M Kaiser
(74) *Attorney, Agent, or Firm* — Andrus Intellectual Property Law, LLP

(57) ABSTRACT

The invention relates to a method for transmitting information from an operating device (K) for lamps (L), in particular a converter for LEDs, to a control unit (ST) connected to the operating device (K) via voltage supply lines (8, 9) thereof, having the following steps: the control unit (ST) preferably periodically temporarily interrupts an AC supply voltage (Vin) of the operating device (K), and the operating device (K) applies a voltage signal (V2) to the voltage supply lines (8, 9) during the interruption of the AC supply voltage (Vin) which is evaluated by the control units (ST) as information.

12 Claims, 1 Drawing Sheet

(58) Field of Classification Search
CPC ............ H05B 33/0896; H05B 37/0245; H05B 37/0254; H05B 37/0263
USPC ................ 315/294, 297, 307, 122, 192, 224
See application file for complete search history.

(56) References Cited

U.S. PATENT DOCUMENTS

| | | | | |
|---|---|---|---|---|
| 2011/0316441 | A1 | 12/2011 | Huynh | |
| 2012/0187870 | A1* | 7/2012 | Iwai | H05B 33/0884 315/307 |
| 2013/0033197 | A1* | 2/2013 | Hwang | H05B 33/0815 315/307 |
| 2013/0293139 | A1* | 11/2013 | Sadwick | H05B 37/02 315/224 |
| 2014/0077713 | A1* | 3/2014 | Otake | H05B 33/0818 315/200 R |
| 2014/0125252 | A1* | 5/2014 | Wu | H05B 33/0815 315/307 |
| 2014/0300274 | A1* | 10/2014 | Acatrinei | H05B 33/0815 315/85 |
| 2016/0156275 | A1* | 6/2016 | Ilic | H05B 33/0806 315/209 R |
| 2016/0183335 | A1* | 6/2016 | Barth | H05B 33/083 315/201 |
| 2016/0212805 | A1* | 7/2016 | Kaashoek | H05B 37/02 |

OTHER PUBLICATIONS

International Search Report dated Aug. 10, 2015 in parent PCT Application PCT/EP2015/055008.

* cited by examiner

OPERATING DEVICE FOR LAMPS FOR TRANSMITTING INFORMATION

CROSS REFERENCE TO RELATED APPLICATION

The present application is the U.S. national stage application of International Application PCT/EP2015/055008, filed Mar. 11, 2015, which international application was published on Oct. 1, 2015 as International Publication WO 2015/144430 A1. The International Application claims priority of German Patent Application 10 2014 205 746.9 filed Mar. 27, 2014.

FIELD OF THE INVENTION

The present invention relates to the transmission of information, or data, starting from an operating device for lamps. The invention relates in particular to a method for transmitting information, an operating device for transmitting information, and a corresponding lighting system.

BACKGROUND

As an example of data transmission in the field of operating devices for lamps, operating devices for electric lamps are already known which have, e.g., a control signal input coupled to a data bus from which the operating device receives digital control signals for controlling the electric lamps.

For transmitting information starting from an operating device, it is furthermore known that the operating device can return different information to a control unit via data lines that have been provided, or via a data bus. In addition to these data lines, separate voltage supply lines are also provided, for supplying the operating device with voltage.

The transmission of data via the electric supply network is also known. With this technology, also known as Power Line Communication (PLC), the carrier frequency of the network voltage is modulated with a high-frequency signal. Operating devices connected to the electric supply network inside a building can thus receive signals starting from a control unit via the electric lines in the building by means of demodulation.

The present invention thus assumes the objective of providing an alternative system for transmitting information starting from an operating device for lamps to a control unit connected to the operating device via its voltage supply lines.

SUMMARY OF THE INVENTION

The aim of the invention, in particular, is to transmit information from an operating device in the form of a converter for lamps, for example, in particular an LED converter, without additional bus lines or other communication channels, which information may, for example, relate to a parameter concerning the light output—such as the LED current or dimming value.

In accordance with a first aspect of the invention, a method is provided for transmitting information from an operating device for lamps, in particular a converter for LEDs, to a control device connected to the operating device via its voltage supply lines. The method has numerous steps. The control unit temporarily interrupts, preferably periodically, an AC supply voltage of the operating device. The operating device applies a voltage signal to the voltage supply lines during the interruption of the AC supply voltage, which is evaluated by the control unit as information.

In accordance with another aspect of the invention, a method is provided for retrieving information from an operating device for lamps, in particular a converter for LEDs, to a control unit connected to the operating device via its voltage supply lines. The method has numerous steps. The control unit temporarily interrupts an AC supply voltage of the operating device through phase cutting at the trailing edge or leading edge. In response thereto, the operating device sends information to the control unit.

In accordance with another aspect of the invention, an operating device for lamps is provided, in particular a converter for LEDs. The operating device is designed for transmitting information to a control unit connected to the operating device via its voltage supply lines. The operating device has means for detecting that the AC supply voltage of the operating device is temporarily interrupted, preferably periodically. The operating device has means for applying a voltage signal to the voltage supply lines during the interruption of the AC supply voltage.

In accordance with another aspect of the invention, a system is provided. The system has such an operating device, as well as a control unit connected thereto via voltage supply lines. The control device can preferably interrupt the supply voltage through phase cutting at the leading edge or trailing edge.

The information transmission can preferably be transmitted from the operating device to the control unit in a digitally encoded form, in that the operating device selectively applies two discrete, different voltage signals to the voltage supply lines during the interruption of the AC supply voltage.

The temporary interruption of the AC supply voltage can preferably be interpreted by the operating device in the sense of a polling command for sending information to the control unit.

The operating device can preferably execute the application to the voltage supply lines starting from a DC voltage in the operating device.

The operating device can preferably execute the application to the voltage supply lines using a galvanically separated transmitter, in which a primary side of the carrier is switched on, and the secondary side of the transmitter is connected to the voltage supply lines.

Further features, advantages and functions of exemplary embodiments of the invention shall become clear from the following detailed description, based on the attached drawings.

DETAILED DESCRIPTION

Figure 1:
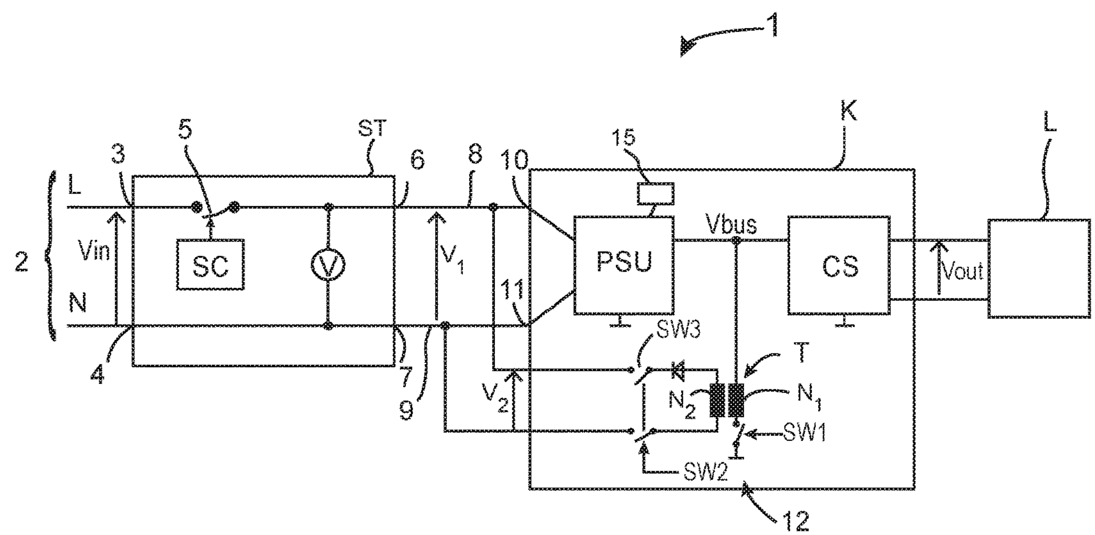
FIG. 1 shows a schematic depiction of a lighting system in accordance with an exemplary embodiment of the present invention.

A schematic depiction of an exemplary embodiment of a lighting system 1 in accordance with the present invention is shown in FIG. 1.

The system 1 comprises three main elements, specifically a control unit ST, a converter K and an LED module L. The control unit ST is connected to a supply network 2. Corresponding input terminals 3, 4 of the control unit ST are provided for connecting to the supply network 2. These input terminals 3, 4 can each be connected to the neutral lead, or neutral conductor N and the phase conductor L of the supply network. The supply network 2 forms an alternating current voltage source, such that a supply voltage Vin is applied to the input terminals 3, 4 in the form of an AC voltage, or alternating current voltage, which can have a frequency, for example, of 50 Hz and an effective amplitude of 220 or 230 V.

The control unit ST comprises a controllable switch 5. Using this switch 5, the control unit ST is capable of conducting, or not conducting, the input-side alternating current voltage Vin to the outputs 6, 7 of the control unit ST. The switch 5 can be controlled by a control circuit SC, i.e. it can be switched on and off. The switch 5 is coupled to the phase conductor L and disposed between the input terminal 3 and the output terminal 6 of the control unit ST. When the switch 5 is actuated, i.e. switched on, the input terminal 3 and the output terminal 6 are electrically bridged.

When, in particular, the switch 5 is switched on, the supply voltage Vin is applied unchanged to the output 6, 7. On the other hand, the initial voltage V1 of the control unit ST is preferably a neutral voltage, as soon as the switch 5 is deactivated. The supply voltage Vin is not conducted further by the control unit ST in the latter case.

The control unit ST can be designed, in particular, to execute a leading edge phase cutting and/or trailing edge phase cutting of the supply voltage Vin. The leading edge phase cutting and/or trailing edge phase cutting of the supply voltage Vin is generated in particular by the switch 5, or by the control circuit SC.

Figure 2:
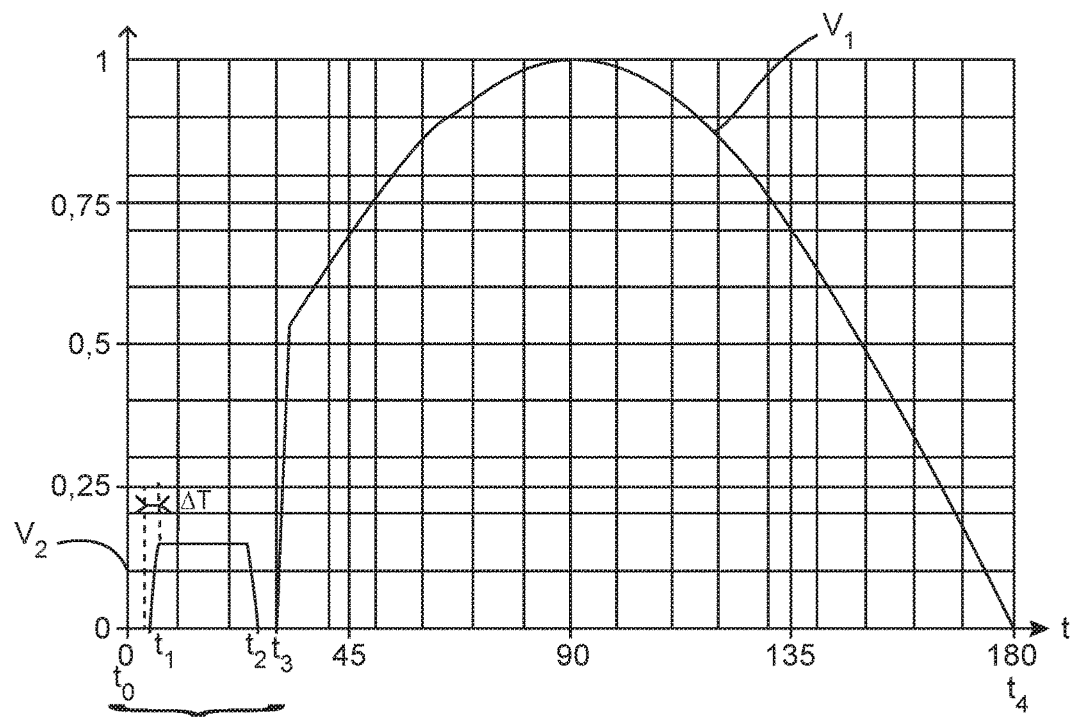
FIG. 2 shows the temporal curve of the voltages of the lighting system according to the invention.

FIG. 2 shows the temporal curve of voltages within the lighting system 1. Among other things, this FIG. 2 shows the curve of the output voltage V1 of the control unit ST during a positive half-wave of the supply voltage Vin. The X-axis represents time, and the Y-axis represents the voltage. In particular, the standardized voltage of the supply voltage Vin is indicated in the Y-axis, i.e. the value of the supply voltage Vin divided by the maximum value of the supply voltage Vin/max.

The positive half-wave of the supply voltage Vin starts at the time t0, and ends at t4. The output voltage V1 is generated by the leading edge phase cutting, i.e. the sinusoidal supply voltage Vin is first kept at zero after a zero crossing, before it regains its value. This means that at time t0, corresponding to a zero crossing of the voltage, the switch 5 is off, or the switch 5 is deactivated by the control circuit SC. This results in the output voltage V1 remaining at zero volts. The switch is first switched on at a later time t3, which is preferably still in the first half of the half-wave. The output voltage V1 corresponds to the supply voltage Vin from time t3 until the end of the half-wave at t=t4.

In contrast thereto, in a trailing edge phase cutting, the output voltage at the start of the half-wave has the value of the supply voltage Vin, and at the end of the half-wave, has a value of 0 volts. Alternatively, the output voltage V1 can have a leading edge and trailing edge phase cutting, wherein it then has a value of 0 volts at the start and at the end of a half-wave of the supply voltage, and corresponds to the momentary value of the supply voltage Vin in the interim.

As is shown in FIG. 1, the output terminals 6, 7 of the control unit ST are connected to the converter K via voltage supply lines 8, 9. The converter can also be generally regarded as an operating circuit for the LED module L.

The output voltage V1 of the control unit ST, generated by the leading edge and/or trailing edge phase cutting of the supply voltage Vin, serves as the electrical supply for the converter K and the LED module L. The converter K comprises two input terminals, or terminal blocks 10, 11 for supplying the output voltage V1 to the control unit.

The converter comprises, at the input side, a bus voltage unit PSU, which is supplied with the output voltage V1, and generates a bus voltage, or intermediate circuit voltage Vbus. The bus voltage unit PSU can have a rectifier and/or a filter (not shown) at the input side. As a result, the supply voltage Vin having a leading edge and/or trailing edge phase cutting can be rectified and, if applicable, filtered.

Preferably, a power factor correction circuit (not shown) is applied to the network voltage after the rectifier and/or filter, which generates in the known manner a nearly constant bus voltage Vbus from the, if applicable, rectified and/or filtered voltage. The bus voltage Vbus can have a periodic and random deviation thereby.

Alternatively or additionally to the power factor correction circuit, the bus voltage unit PSU can have a direct current voltage converter, which ensures, in the known manner, that the output of the bus voltage unit PSU is an at least nearly constant bus voltage Vbus.

The bus voltage Vbus is supplied to a direct current voltage converter CS, which serves as a current source for the LED module L. Direct current voltage converters are already known per se. By way of example, the direct current voltage converter CS can be designed as a converter without a galvanic separation, e.g. as a down converter. Alternative topologies in the form of a converter with a galvanic separation are contemplated for the direct current voltage converter CS, e.g. in the form of a resonance converter.

The output voltage Vout of the converter K, i.e. the output of the direct current voltage converter CS, serves to operate the LED module L. The LED module L is an example of a lamp that can be connected to the converter K. By way of example, a gas discharge lamp could also be operated by the converter K. Preferably, the converter K is used to operate at least one LED. Preferably, an LED string operated by the converter K can have numerous LEDs connected in series. Alternatively, LEDs arranged in parallel, or a combination of LEDs connected in parallel and in series can be supplied. At least one LED is provided in the LED module 1 shown in FIG. 1. Alternatively, numerous LED modules, connected in series and/or in parallel to one another, can be connected to the converter K.

In accordance with the invention, the converter K is thus designed to apply a voltage signal V2 to the voltage supply lines 8, 9. The voltage signal V2 is applied, in particular, during an interruption of the output voltage V1, i.e. during a leading edge and/or trailing edge phase cutting gap.

This operation is shown in FIG. 2. In the exemplary embodiment shown therein, the output voltage V1 of the control unit ST has a gap, or a leading edge phase cutting, at the start of the half-wave. Between the times t0 and t3, the output voltage V1 corresponds to a zero voltage. The converter applies the voltage signal V2 in this gap 20. The voltage signal V2 is depicted in the form of a square wave signal between the times t1 and t2, wherein t0<t1 and t2<t3. The steepness of the flanks of the voltage signal V2 can be limited, i.e. it can last for a period of ΔT, until the square wave signal rises from zero to the constant positive value, and then falls from the positive value to zero. Similarly, there can also be a limited steepness in the rise of the output voltage V1 after the leading edge phase cutting.

The voltage signal V2 can be generated, e.g., by a flyback converter 12 which can be supplied with power, in particular, by the bus voltage Vbus. This flyback converter 12 comprises a transducer T in the form of a transformer, for example, having a primary winding N1 and a secondary winding N2. The transducer T serves to separate the potentials between a primary side, having the primary winding N1, and a secondary side, having the secondary winding N2. The voltage signal V2 is applied to the voltage supply lines on secondary side of the transducer.

The flyback converter 12 comprises a controllable switch SW1, which is connected in series to the primary winding N1. In the known manner, energy made available, by means of an appropriate alternating opening and closing of the switch SW1, from the voltage Vbus applied at the input side on the flyback converter can be applied to the secondary side of the flyback converter 12. The energy transmission occurs thereby when the switch SW1 is in the deactivated state, wherein a diode is also provided for this on the output side of the flyback converter 12.

The frequency and the pulse duty factor for activating the switch SW1 determine the amplitude of the voltage at the secondary winding N2, or determine the ratio of this amplitude to the bus voltage Vbus. Through a targeted on and off switching of the switch SW1, the converter K is thus capable of determining the height of the amplitude of the voltage at the secondary winding N2.

The converter K moreover comprises two further switches SW2, SW3 in order to apply the voltage at the secondary winding N2 in a targeted manner to the voltage supply lines 8, 9. The series circuit from the secondary winding N2 and the diode is interconnected between the two switches SW2, SW3. While the first terminal of these switches SW2, SW3 is connected to the secondary winding N2, or the diode, respectively, the second terminal of these switches SW2, SW3 is connected, in each case, with one of the voltage supply lines 8, 9.

The switches SW2, SW3 are switched on and off simultaneously, in order to selectively apply the voltage signal V2 to the voltage supply lines 8, 9. These switches SW2, SW3 are activated by a control circuit 15 of the converter K, wherein this control circuit 15 can determine, or detect, in particular, a gap 20, or a leading edge and/or trailing edge phase cutting of the output voltage V1. The control circuit 15 can control the switches SW2, SW3 such that the voltage signal V2 is applied in a targeted manner, in a gap 20, or in a leading edge and/or trailing edge phase cutting, to the voltage supply lines 8, 9. The switch SW1 is preferably likewise controlled by the control unit 15 of the converter K.

The control unit ST is then designed, according to the invention, to capture the voltage at the output terminals 6, 7, in particular in the gap 20, or the leading edge and/or trailing edge phase cutting, that is created. This voltage can be evaluated by the control unit as information.

The control unit ST preferably captures the voltage at the output terminals 6, 7, substantially in the middle of the gap 20, i.e. substantially at the point in time (t1+t2)/2. The converter preferably ensures that the voltage signal V2 is present in the middle of the gap 20. Temporal synchronization of the control unit ST and the converter K is important, in order to ensure that an applied voltage signal V2 is also correctly recorded.

A binary code can be derived from the voltage detected by the control unit ST during a leading edge and/or trailing edge phase cutting. The reference symbol V in FIG. 1 represents a means here for recording the output voltage V1, such as a potentiometer, for example. If a positive voltage V2 is recorded in the gap 20, for example, this corresponds to the logical value of 1. If, in contrast, the control unit ST records a zero voltage in the gap 20, this can be interpreted as the logical value of 0. A reversal of the values 1 and 0 is of course possible. Through a selective application of the voltage signal V2 to numerous successive half-waves of the output voltage V1 and through a corresponding recording thereof by the control unit ST, it is possible, according to the invention, to transmit bits, or bit strings, and thus digital information, from the converter K to the control unit ST.

In the exemplary embodiment described above, the converter K can either apply a constant, positive voltage signal V2 or the zero voltage. Alternatively, the converter can also selectively apply another constant voltage signal V3, wherein the amplitudes of the signals V2 and V3 should be different. Thus, the converter K can transmit the logical information 0, 1 or 2 to the control unit ST, each time the voltage signal 0 volts, V2 or V3 is applied. The converter can apply even more different amplitude values in this sense, wherein more information can then be transmitted within a half-wave. On the other hand, this can result, in certain circumstances, in difficulties in the correct transmission of the digital information by the control unit.

The converter K preferably transmits information after an appropriate query, or polling command by the control unit ST. For this, e.g., the presence of a leading edge and/or trailing edge phase cutting in a half-wave of the output voltage V1 can be evaluated by the converter K as a logical 0. A half-wave of the output voltage V1 without a gap 20, or without a leading edge and/or trailing edge phase cutting, can conversely be determined as a logical 1 by the converter K. A reversed interpretation as a logical 1 and logical 0 is of course possible. As a result, the control unit ST can send digital data to the converter K, such as commands, for example, wherein each command is defined by a specific bit string.

The control unit can thus, e.g., send the converter K a command for transmitting specific information. This command is determined in particular by the converter K by measuring the output voltage V1 in numerous successive half-waves. As soon as the control unit ST has sent the command, it executes a leading edge and/or trailing edge phase cutting in each half-wave in order to enable a return of information by the converter K. The converter K can then transmit the desired information through a targeted application over the voltage supply lines to the control unit ST.

The transmitted information can relate to the value of an electrical parameter of the converter or the LED module—e.g. current through the LEDs—or to the temperature in the region of the converter. Alternatively, the converter can be coupled to some arbitrary sensor (not shown), e.g. a movement sensor or daylight sensor, and with an appropriate query from the control unit ST, transmit a measurement value from this sensor to the control unit ST.

In accordance with the invention, a protocol for the output voltage V1 regarding properties of the leading edge and/or trailing edge phase cutting can be stipulated between a control circuit and the LED converter. The bit string, obtained by means of the control unit ST from the leading edge and/or the trailing edge phase cutting, is not simply converted to a dimming value. Instead, complex encodings of the leading edge or trailing edge phase cutting sequences can be evaluated as queries/commands.

The present invention enables the transmission of appropriate information from the converter K back to the control unit ST. The communication between the converter K and the control unit ST is bi-directional. Alternatively, it can also be provided, according to the invention, that at least one data transmission from the LED converter to the control unit ST occurs.

In accordance with the invention, information from the converter K is retrieved when an appropriate retrieval command (polling) is sent from the control unit ST to the converter K, encoded by the leading edge or trailing edge phase cutting, respectively.

The converter K uses the time period t0-t3 for the return path from the converter K to the control unit ST when the control unit ST interrupts the supply voltage in the manner of a leading edge or trailing edge phase cutting. More precisely, the converter K modulates a voltage to form the interrupted supply voltage in accordance with a defined protocol, in the leading edge phase cutting gap or in the trailing edge phase cutting gap, respectively. The control unit ST reads the modulated voltage signal V2 in the leading edge phase cutting gap or in the trailing edge phase cutting gap.

In accordance with the present invention, there is no modulation of the output voltage V1, in particular, but rather, the information is returned by the converter (slave) to the control unit (master) in time periods in which the supply voltage is entirely shut off.

In accordance with the present invention, information is preferably modulated on the voltage supply lines for the return channel from the converter to the control unit while the supply voltage is shut off by the control unit, by means of a separate supply voltage of the converter.

The advantage with the invention is also that, due to the interrupted supply line at the control unit, the information voltage V2 selectively switched on by the converter K is sent only as far as the control unit ST, but is unable to be conducted further, due to the interruption.

What is claimed is:

1. A method for transmitting information bidirectionally between an operating device (K) for one or more lamps (L) comprising a direct current voltage converter (CS) and a control unit (ST), the method having the following steps:

providing a control unit (ST) comprising a pair of inputs (3,4) to which an input-side AC supply voltage (Vin) is applied, a pair of outputs (6,7), a controllable switch (5) that conducts the input-side AC voltage when closed to the outputs (6,7) of the control unit (ST), and a first control circuit (SC) that controls the opening and closing of the switch (5);

providing an operating device (K) for lamps (L) comprising, a pair of inputs (10, 11) for the operating device, bus voltage unit (PSU) including a rectifier, a direct current voltage converter (CS), a pair of outputs from the operating device (K) to one or more lamps (L), and a second control circuit (15);

providing voltage supply lines (8, 9) between the outputs (6,7) of the control unit (ST) and the inputs (10, 11) of the operating device (K);

controlling the switch (5) with the first control circuit (SC) in the control unit (ST) to temporarily interrupt the input-side AC supply voltage (Vin) on a selective, periodic basis to create gaps (20) in selected half waves of the sinusoidal waveform of the output voltage (V1) supplied to the operating device (K) over the voltage supply lines (8,9), wherein information is encoded by the control unit (ST) as sequences of the presence or absence of a gap (20) in a respective half wave in order to send information from the control unit (ST) to the operating device (K) over the voltage supply lines (8,9);

using the second control circuit (15) in the operating device (K) to evaluate as information sequences of gaps (20) in the respective half wave of the sinusoidal waveform of the output voltage (V1) that is provided to the inputs (10, 11) of the operating device (K) over voltage supply lines (8, 9); and using the operating device (K) to selectively apply a voltage signal (V2, V3) to the voltage supply lines (8, 9) during the gaps (20) to numerous successive half waves of the output voltage (V1), wherein information is encoded by the operating device (K) as sequences of the presence or absence of a voltage signal (V2, V3) in gaps (20) in successive half waves in order to send information from operating device (K) to the the control unit (ST) over the voltage supply lines (8,9); and evaluating the sequences of voltage signals (V2, V3) in gaps (20) in successive half waves as information by the control unit (ST).

2. The method according to claim 1, wherein the control unit (ST) interrupts the supply voltage (Vin) by means of a leading edge or trailing edge phase cutting or both.

3. The method according to claim 1, wherein the information transmission from the operating device (K) to the control unit (ST) is transmitted in a digitally encoded form, in that the operating device (K) selectively applies at least two discrete, different, voltage signals to the voltage supply lines (8, 9) during the interruption of the AC supply voltage (Vin).

4. The method according to claim 1, in which the temporary interruption of the AC supply voltage (Vin) is interpreted by the operating device (K) as a polling command for sending information to the control unit (ST).

5. The method according to claim 1, in which the operating device (K) executes the application the voltage signal (V2, V3) to the voltage supply lines (8, 9) starting from a DC voltage in the operating device (K) through switches (SW2, SW3) controlled by the operating device (K) and a diode that is resistant to electrical flow in the direction from the control unit (ST) towards the diode.

6. The method according to claim 5, in which the operating device (K) executes the application to the voltage supply lines (8, 9) using a galvanically separated transducer (T), with a primary side of transducer (T) switched on and the secondary side of the transducer (T) connected to the voltage supply lines (8, 9) through the switches (SW2, SW3) controlled by the operating device (K) and said diode.

7. A method for retrieving information from an operating device (K) for LEDS (L) to a control unit (ST) connected via voltage supply lines (8, 9) to the operating device (K), the method having the following steps:

providing a control unit (ST) comprising a pair of inputs (3,4) to which an input-side AC supply voltage (Vin) is applied, a pair of outputs (6,7), a controllable switch (5) that conducts the input-side AC voltage when closed to the outputs (6,7) of the control unit (ST), and a first control circuit (SC) that controls the opening and closing of the switch (5);

providing an operating device (K) for LEDs (L) comprising, a pair of inputs (10, 11) for the operating device, bus voltage unit (PSU) including a rectifier, a direct current voltage converter (CS), a pair of outputs from the operating device (K) to one or more lamps (L), and a second control circuit (15);

providing voltage supply lines (8, 9) between the outputs (6,7) of the control unit (ST) and the inputs (10, 11) of the operating device (K);

controlling the switch (5) with the first control circuit (SC) in the control unit (ST) to temporarily interrupt the input-side AC supply voltage (Vin) on a selective, periodic basis to create gaps (20) in selected half waves of the sinusoidal waveform of the output voltage (V1) supplied to the operating device (K) over the voltage supply lines (8,9);

detecting the presence of gaps (20) in selected half waves of the sinusoidal waveform of the output voltage (V1) supplied to the operating device (K) over the voltage supply lines (8,9);

in response to the detection of gaps (20) using the operating device (K) to selectively apply a voltage signal (V2, V3) to the voltage supply lines (8, 9) during the gaps (20); wherein the operating device (K) executes the application of the voltage signal (V2, V3) to the voltage supply lines (8, 9) using a galvanically separated transducer (T) connected between the bus voltage unit (PSU) and the direct current voltage converter (CS) with a primary side of transducer (T) switched on and the secondary side of the transducer (T) connected to the voltage supply lines (8, 9) through the switches (SW2, SW3) controlled by the operating device (K) and a diode that is resistant to electrical flow in the direction from the control unit (ST) towards the secondary winding; and evaluating the sequences of voltage signals (V2,V3) in gaps (20) in successive half waves as information by the control unit (ST).

8. A system for operating one or more LED lamps (L) comprising:

a control unit (ST) comprising a pair of inputs (3,4) to which an input-side AC supply voltage (Vin) is applied, a pair of outputs (6,7), a controllable switch (5) that conducts the input-side AC voltage when closed to the outputs (6,7) of the control unit (ST), and a first control circuit (SC) that controls the opening and closing of the switch (5);

an operating device (K) for lamps (L) comprising, a pair of inputs (10, 11) for the operating device, bus voltage unit (PSU) including a rectifier, a direct current voltage converter (CS), a pair of outputs from the operating device (K) to one or more LED lamps (L), and a second control circuit (15);

voltage supply lines (8, 9) between the outputs (6,7) of the control unit (ST) and the inputs (10, 11) of the operating device (K);

wherein the switch (5) is controlled with the first control circuit (SC) in the control unit (ST) to temporarily interrupt the input-side AC supply voltage (Vin) on a selective, periodic basis to create gaps (20) in selected half waves of the sinusoidal waveform of the output voltage (V1) supplied to the operating device (K) over the voltage supply lines (8,9);

and said second control circuit (15) in the operating device (K) detects when the AC supply voltage (Vin) of the operating device (K) is temporarily interrupted, and system further comprises:

means for applying a voltage signal (V2, V3) to the voltage supply lines (8, 9) during the interruption of the AC supply voltage (Vin) in order to send information from the operating device (K) to the control unit (ST); and a potentiometer that detects the status of the voltage signal (V2,V3) on the voltage supply lines (8, 9) during the gaps (20) in which the AC supply voltage (Vin) is temporarily interrupted and the operating device (K) is sending information to the control unit (ST).

9. A system recited in claim 8 wherein said means for applying a voltage signal (V2) to the voltage supply lines (8, 9) during the interruption of the AC supply voltage (Vin) comprise a galvanically separated transducer (T) connected between the bus voltage unit (PSU) and the direct current voltage converter (CS) with a primary side of transducer (T) switched on and the secondary side of the transducer (T) connected to the voltage supply lines (8, 9) through switches (SW2, SW3) controlled by the operating device (K) and a diode that is resistant to electrical flow in the direction from the control unit (ST) towards the secondary winding.

10. The operating device (K) for lamps (L) recited in claim 8 wherein the control unit (ST) interrupts the supply voltage (Vin) by means of a leading edge or trailing edge phase cutting or both.

11. A method according to claim 3 wherein the voltage signal comprises a zero voltage state, and multiple positive voltage states each having a different amplitude.

12. A method according to claim 1 wherein the information sent to the control unit (ST) relates to a measurement value from a sensor.

* * * * *